March 13, 1928.

M. L. BURGESS

PROCESS OF MAKING DECORATED GLASSWARE

Filed March 8, 1926

1,662,295

INVENTOR.
MARTIN L. BURGESS.

BY
ATTORNEYS.

Patented Mar. 13, 1928.

1,662,295

UNITED STATES PATENT OFFICE.

MARTIN L. BURGESS, OF INDIANAPOLIS, INDIANA, ASSIGNOR TO MARIETTA MFG. CO., OF INDIANAPOLIS, INDIANA, A CORPORATION.

PROCESS OF MAKING DECORATED GLASSWARE.

Application filed March 8, 1926. Serial No. 93,176.

This invention relates to the process of decorating glassware.

The chief object of the invention is to decorate glassware by providing an ornamental pattern or outline, forming the same in the glassware while hot and varying the depth or tone of the color of the surface to conform to the pattern or outline for bringing out the outline.

The chief feature of the invention consists in the subjection of substantially uniformly colored glassware while hot to unequal surface cooling and non-uniform surface pressure for varying the depth or tone of the color of the surface and securing such variation through a pattern, the outline of which corresponds to the variation in the depth or tone of the color of the glassware surface.

Figure 1:
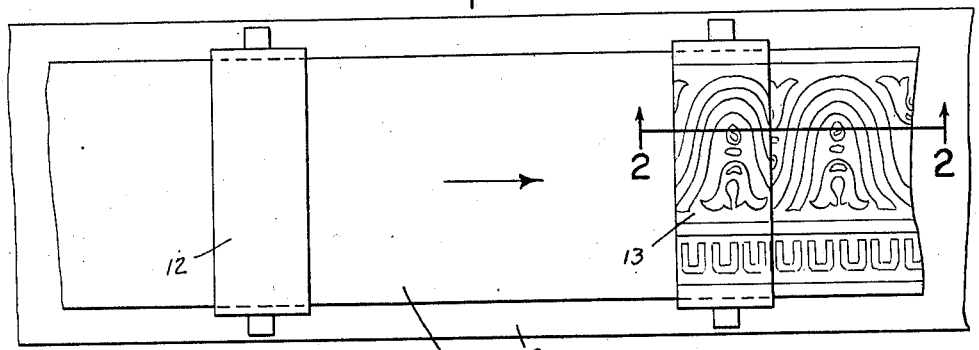
Figure 2:
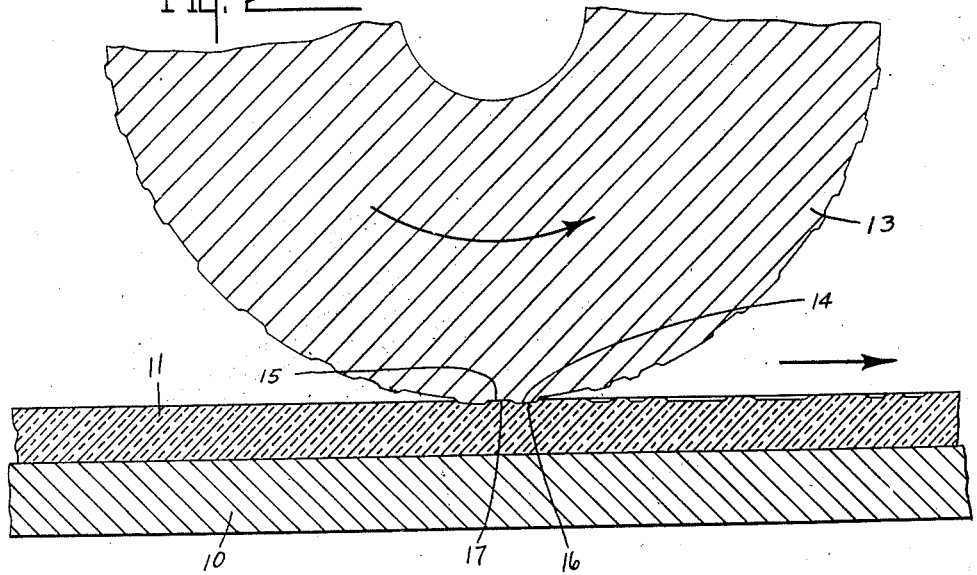
Figure 3:
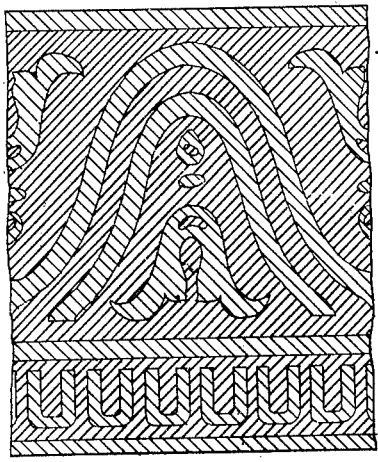

The full nature of the invention will be understood from the accompanying drawings and the following description and claim:

In the drawing Fig. 1 is a top plan view of apparatus suitable for ornamenting glassware. Fig. 2 is an enlarged transverse sectional view taken on line 2—2 of Fig. 1 and in the direction of the arrows. Fig. 3 is a top plan view of a piece of ornamented glassware, the shading being of the same color but indicating the variation in the depth or tone of color.

In the drawings 10 indicates a suitable table or support for receiving a sheet of glass 11, which glass is substantially uniformly colored throughout its mass. A roll 12 is positioned so that the sheet of glass 11 passes therebetween and secures a glass sheet of substantially uniform thickness. Another roll 13 is positioned adjacent thereto and between said roll 13 and the table or support 10 the sheet of glass 11 passes so that when the sheet leaves the roll 13 it has a surface which is provided with an ornamental outline and the ornamental outline is brought out by variations in the depth or tone of color.

Reference will now be had to Fig. 2 for a detailed explanation of the supposed theoretical basis of the process and for a detailed description of the means employed in practicing the same. The bed plate or table 10 supports the glass sheet 11. The corrugated roll 13 is positioned in spaced relation to the plate or bed 10 and the sheet of glass passes therebeneath. The sheet of glass previously has been formed with a substantially uniform depth and the glass material itself is substantially uniformly colored throughout its mass. The surface of the roll 13 is of unequal depth corresponding to the pattern or outline desired. The same may consist of a bronze roll etched with acid forming ridges 14 and hollows 15 therein. The glass sheet in the relative movement between the sheet and the roll subjects the portion 16 immediately opposite the height 14 of roll 13 to slightly greater pressure than the portion 17 which is seatable in the depression 15 of the roll 13. That portion of the glass surface 17 which projects from the main body of the glass as determined by the depth of the depression 16 therein is relatively specifically exposed and is in greater surface contact with the roll than the depressed portion 16, and therefore, the heat in this specifically exposed portion of the glassware is conducted away more rapidly by the roll from said glassware than from the portion 16 immediately adjacent the main body of the glassware and therefore portion 17 is cooled to a greater extent or faster than portion 16. The materials employed are of such a character that although the glassware is uniformly colored throughout its mass and although uniform color will always be obtained when subjected to a smooth roll, subjection to a corrugated roll will, while the glass is hot, form in the glassware the outline of the corrugated roll and vary the depth or tone of color corresponding to the corrugations, the deeper color being in that portion of the glassware corresponding to that indicated at 16 and the lighter color being obtained in that portion corresponding to the elevations 17.

In Fig. 3 one sample pattern is conventionally illustrated, the different shading indicating variation in tone or the depth of color and the full lines indicating the outline. The actual difference in depth or height between the elevation and depression in the glassware is barely perceptible to the touch, yet such difference in its formation is sufficient to secure not only the desired outline but also the desired variation in the depth or tone of color.

Merely for a reasonable explanation and not in any way by way of restriction is the foregoing theoretical explanation included.

The invention generically consists of subjecting substantially uniformly colored glassware while hot to surface operation for cooling the glassware non-uniformly to secure a non-uniform and corresponding pattern therein and of varying depths or tones of color.

The invention claimed is:

The process of producing a two-tone color effect in glassware, which consists in subjecting a plate of glass of uniform color throughout and while hot to a roll having a pattern surface etched thereon.

In witness whereof I have hereunto affixed my signature.

MARTIN L. BURGESS.